(12) United States Patent
Deligia et al.

(10) Patent No.: US 10,884,828 B2
(45) Date of Patent: Jan. 5, 2021

(54) SYNCHRONOUS INGESTION PIPELINE FOR DATA PROCESSING

(71) Applicant: OPEN TEXT SA ULC, Halifax (CA)

(72) Inventors: Agostino Deligia, Dorval (CA); Cristian Viorel Suciu, Richmond Hill (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 16/779,276

(22) Filed: Jan. 31, 2020

(65) Prior Publication Data

US 2020/0167213 A1 May 28, 2020

Related U.S. Application Data

(63) Continuation of application No. 15/906,904, filed on Feb. 27, 2018, now Pat. No. 10,579,447.

(60) Provisional application No. 62/465,411, filed on Mar. 1, 2017.

(51) Int. Cl.
  *G06F 9/44* (2018.01)
  *G06F 9/54* (2006.01)
  *G06F 16/16* (2019.01)

(52) U.S. Cl.
  CPC .......... *G06F 9/544* (2013.01); *G06F 16/164* (2019.01); *G06F 2209/541* (2013.01)

(58) Field of Classification Search
  CPC .................................................. G06F 9/544
  USPC ...................................................... 719/328
  See application file for complete search history.

(56) References Cited

U.S. PATENT DOCUMENTS

| 9,495,207 | B1* | 11/2016 | Pjesivac-Grbovic ... G06F 9/546 |
| 2015/0254116 | A1* | 9/2015 | Kim .................. G06F 9/546 719/314 |
| 2016/0092476 | A1 | 3/2016 | Stojanovic |
| 2018/0239617 | A1* | 8/2018 | Zusman .............. G06F 16/258 |
| 2018/0253344 | A1 | 9/2018 | Deligia et al. |

OTHER PUBLICATIONS

Office Action issued for U.S. Appl. No. 15/906,904, dated May 28, 2019, 13 pages.
Notice of Allowance issued for U.S. Appl. No. 15/906,904, dated Oct. 23, 2019, 7 pages.

* cited by examiner

*Primary Examiner* — Timothy A Mudrick
(74) *Attorney, Agent, or Firm* — Sprinkle IP Law Group

(57) ABSTRACT

A method for synchronous ingestion of input content may include determining, from an ingestion request, applicable ingestion pipeline components and an order by which the ingestion pipeline components are to be applied to input content; applying the ingestion pipeline components to the input content in the order determined from the ingestion request; updating a metadata file as the input content is processed by the ingestion pipeline components; and returning processed content, the metadata file, or both to a client device. The method may further include determining whether the ingestion request specifies a computing facility such as an indexer or a database downstream from the ingestion pipeline. If so, a processing result may be communicated to the computing facility for further processing. A server system may implement synchronous ingestion, asynchronous ingestion, or both.

20 Claims, 4 Drawing Sheets

SYNCHRONOUS INGESTION PIPELINE FOR DATA PROCESSING

CROSS-REFERENCE TO RELATED APPLICATIONS

This application is a continuation of, and claims a benefit of priority under 35 U.S.C. § 120 from U.S. patent application Ser. No. 15/906,904, filed Feb. 27, 2018, entitled "SYNCHRONOUS INGESTION PIPELINE FOR DATA PROCESSING," issued as U.S. Pat. No. 10,579,447, which claims a benefit of priority under 35 U.S.C. § 119(e) to U.S. Provisional application Ser. No. 62/465,411, filed Mar. 1, 2017, entitled "SYNCHRONOUS INGESTION PIPELINE FOR DATA PROCESSING," the entire contents of which are hereby expressly incorporated by reference for all purposes.

TECHNICAL FIELD

This disclosure relates generally to data processing in computing environments. More particularly, this disclosure relates to a synchronous, on-demand ingestion pipeline useful for various types of data processing systems, including information management systems.

BACKGROUND OF THE RELATED ART

In computing, a pipeline refers a set of data processing elements connected in series, where the output of one data processing element is the input of the next one. An ingestion pipeline is an example of such a pipeline. An ingestion pipeline can ingest and process input data in a process flow involving various data processing elements connected in a predetermined order. An example of input data can be, for instance, data collected by a data gatherer or crawler.

Such an ingestion pipeline generally processes data in an asynchronous manner. That is, data is processed by the ingestion pipeline in a predetermined order in one direction and the process flow does not return any processing output (e.g., processed data) back out of the ingestion pipeline in another direction. Rather, the processed data would be provided or moved to another computing facility downstream from the ingestion pipeline. To this end, an ingestion pipeline is useful for ingesting input data from data source(s) and preparing output data ready for further processing, for instance, indexing by an indexer (e.g., an indexing engine or a search engine). However, no upstream computing facilities could leverage the data processing functionality of the ingestion pipeline as the ingestion pipeline is not built to return, and thus is not capable of returning, processing results upstream from the ingestion pipeline. In view of the foregoing, there is room for technical innovations and improvements.

SUMMARY OF THE DISCLOSURE

An object of the invention is to provide a technical solution for processing data, including various types of content such as documents, in a flexible, customizable, and dynamic manner. According to embodiments, this goal can be realized in a new, synchronous ingestion pipeline disclosed herein.

In some embodiments, a data ingestion method may include receiving an ingestion request from a client device to ingest data and perform a synchronous ingestion process. The ingestion request may be received by an ingestion pipeline via a uniform ingestion pipeline application programming interface (API). The ingestion pipeline may be embodied on a server machine having a processor and a non-transitory computer memory.

In some embodiments, data to be ingested (e.g., input content and, optionally, a metadata file containing metadata conforming to a master metadata schema associated with the input content) may be received. In some embodiments, if no metadata file is received, a metadata file may be automatically generated. The metadata file may include a set of properties and/or attributes of the input content to be ingested. As an example, input content can be a binary file. In this disclosure, a binary file refers to a computer file that is not a text file—a "non-text" file. Many binary file formats contain parts that can be interpreted as text. A Word document with an extension of "doc" is an example of a type of binary file formats. Other examples of a binary file may include a Hypertext Markup Language (HTML) file, Portable Document Format (PDF) document, an image, an audio, a video, etc.

In some embodiments, the uniform ingestion pipeline API is a RESTful API that implements Representation State Transfer (REST) architecture. A plurality of client devices may communicate with the ingestion pipeline via the same RESTful API.

In some embodiments, the ingestion pipeline may determine whether the ingestion request specifies a query parameter referencing any ingestion pipeline components. If the ingestion request does not specify a query parameter, an asynchronous ingestion pipeline may be instantiated to process (and hence is also referred to as an asynchronous ingestion process) the input content in a unidirectional, asynchronous manner with a fixed set of ingestion pipeline components applied to the input content in a predetermined order. Any results from the asynchronous ingestion pipeline are provided to an indexer and no further information is returned by the ingestion pipeline to the client device.

In some embodiments, if the ingestion request specifies a query parameter, a synchronous ingestion pipeline may be instantiated to process the input content with a custom set of ingestion pipeline components applied to the input content per an order that is specified in the ingestion request. Accordingly, in some embodiments, a method for synchronous ingestion of input content may include determining, from the ingestion request, applicable ingestion pipeline components and an order by which a custom number of ingestion pipeline components are to be applied to input content; applying the custom number of ingestion pipeline components to the input content in the order determined from the ingestion request; updating a metadata file as the input content is processed by the custom number of ingestion pipeline components in the synchronous ingestion pipeline; and returning the processed content, the metadata file, or both to the client device. In some embodiments, a text file containing text extracted from the input content may also be returned to the client device.

In some embodiments, the method may further include determining whether the ingestion request specifies a computing facility such as an indexer or a database downstream from the ingestion pipeline. If so, a processing result (e.g., the processed content, the metadata, and/or the text file) may be communicated to the computing facility for further processing.

In one embodiment, a system may comprise at least one processor, at least one non-transitory computer-readable storage medium, and stored instructions translatable by the at least one processor to perform a method substantially as described herein. Another embodiment comprises a computer program product having at least one non-transitory computer-readable storage medium storing instructions translatable by at least one processor to perform a method substantially as described herein. Numerous other implementations may also be possible.

Embodiments disclosed herein can provide many technical advantages. For example, the synchronous ingestion pipeline can be utilized in place or independently of an asynchronous ingestion pipeline, providing flexibility and increasing performance for the underlying data processing system.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

An ingestion pipeline can ingest raw content from a crawler or other imports and process through the ingestion pipeline with multiple data processing components, processors, functions, or elements (which are collectively referred to herein as "ingestion pipeline components"). These ingestion pipeline components may perform various functions. For instance, a document converter can examine a document and convert the document from one format to another; a language detector can identify and process the language of the document; an analyzer can enrich the content and extract desired additional metadata such as entities, names, etc. from the document; and a formatter can format the document for output to another computing element or a search platform such as a full-text search server called Solr, or other exports. Solr is known to those skilled in the art and thus is not further described herein.

Figure 1A:
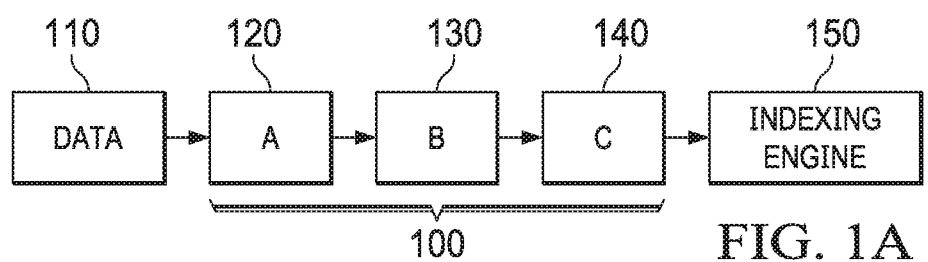
FIG. 1A depicts a diagrammatic representation of an example of an asynchronous ingestion pipeline.

As discussed above, an ingestion pipeline generally processes data in an asynchronous manner. For example, as illustrated in FIG. 1A, asynchronous ingestion pipeline 100 may have a process flow involving ingestion pipeline components 120, 130, and 140. In this case, input data 110 is processed by ingestion pipeline 100 in a predetermined order in one direction (i.e., ingestion pipeline 100 is unidirectional) and the process flow does not return any processing output from ingestion pipeline 100. Specifically, input data 110 is processed in one direction in the predetermined order of function A (component 120), then function B (component 130), then function C (component 140). Output is provided to indexing engine 150, downstream from ingestion pipeline 100, and no information is flowed back or returned upstream from ingestion pipeline 100.

While such an asynchronous ingestion pipeline is useful for ingesting input data from data source(s) and preparing output data ready for indexing, in some cases, a client of an ingestion pipeline (or a client of data processing system or an information system that leverages an ingestion pipeline) may desire to utilize the processing capabilities of an ingestion pipeline to process certain data without the data having been indexed into an index or stored on the server side. To this end, embodiments disclosed herein provide a new synchronous ingestion pipeline capable of returning processing results back to a requesting client and allowing flexible on-demand configuration of ingestion pipeline processing and output destination(s).

In some embodiments, with the synchronous ingestion pipeline disclosed herein, a requesting client (e.g., a client application running on a client device of an information processing or access platform such as OpenText InfoFusion™, available from Open Text, headquartered in Canada) can specify a custom number of ingestion pipeline components that should be used to process data provided by the client device, specify an order by which the ingestion pipeline components perform their functions, and also specify how output from the ingestion pipeline should be handled (e.g., returned to the client device and/or provided to an indexer of a search system or a relational database). An example of such a synchronous ingestion pipeline is shown in FIG. 1B.

Figure 1B:
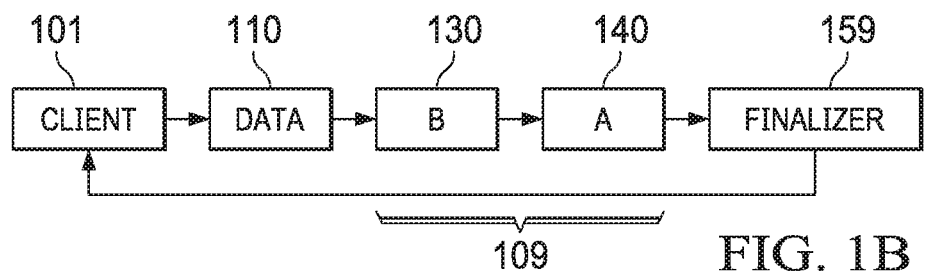
FIG. 1B depicts a diagrammatic representation of an example of a synchronous ingestion pipeline.

As illustrated in FIG. 1B, in response to an ingestion request from client 101, synchronous ingestion pipeline 109 is operable to process input data 110 in an order that is determined, on-demand, per the ingestion request received from client 101. In this case, the ingestion request from client 101 specifies a special query parameter "components" which is followed by two ingestion pipeline components by name in a particular order: "B, A" which indicates that function B (component 130) is to be called, followed by function A (component 120). The ingestion request does not specify function C (component 140), so function C is not applied to input data 110, even though function C is supported by the underlying ingestion pipeline platform. At the end of the processing, synchronous ingestion pipeline 109 calls finalizer 159 which returns processing results from synchronous ingestion pipeline 109 back to client 101.

In some embodiments, each ingestion pipeline component can be associated with one or more activation rules which can override what is specified in a client's ingestion request. These activation rules can be content sensitive. For example, suppose an ingestion pipeline component, HTML content processor, can only process content in the HTML. If a client names the HTML content processor in an ingestion request, but the content to be processed by the ingestion pipeline is actually a PDF document, an activation rule associated with the HTML content processor can be used to examine the content and determine whether the HTML content processor is to be activated. In this case, since the HTML content processor can only process HTML content and not PDF content, the activation rule associated with the HTML content processor can override the client's ingestion request and, as a result, the HTML content processor is not called by the ingestion pipeline to process the PDF content. Rather, the content is routed or passed to the next ingestion pipeline component, if there is one specified in the ingestion request or, if not, to the finalizer.

In this way, in addition to providing a client with the flexibility to customize how the ingestion pipeline is to ingest input data and output processed data, embodiments disclosed herein can improve the efficiency and effectiveness in how data is routed or flows to various ingestion pipeline components for different kinds of processing based on particular data processing needs specific to the data being processed. For example, image content may be processed by a particular image processor, video content may be processed by a video processor, and so on.

In some embodiments, ingestion pipeline components may be readily plugged into a synchronous ingestion pipeline when needed. Many different types of ingestion pipeline components can be added this way. For example, in addition to image processors and video processors, there can be language detectors, conversion services (e.g., for converting binary data to text), analyzer, summarizer (which summarizes data into more manageable pieces), Solr indexers, database adapters, etc. As described above, in a synchronous ingestion pipeline, input data is processed in a custom-defined (not fixed or predetermined) workflow or process flow that directs the data from one ingestion pipeline component to the next until it is output to a client device, Solr, a relational database, or other destinations.

As illustrated in FIG. 1B, unlike an asynchronous ingestion pipeline, embodiments of a synchronous ingestion pipeline disclosed herein are not required to output to Solr or a database. Rather, each synchronous ingestion pipeline can, responsive to a requesting client, perform dynamically, on demand, to enrich content provided by the requesting client (which can represent an external system that operates independently of the synchronous ingestion pipeline). The enriched content can be returned back to the requesting client and does not need to go into Solr or a database, if the client chooses to do so. Additional flexibility and customizability of a synchronous ingestion pipeline can be found in the types and numbers of ingestion pipeline components that can be dynamically added to a process flow of a synchronous ingestion pipeline, as well as the order in which they are called to work in the process flow.

Also, unlike an asynchronous ingestion pipeline, which has only one configuration (i.e., one fixed order of a sequence of a specific set of components) while the system is running, the process flow of a synchronous ingestion pipeline is not fixed at runtime and can be customizable, for instance, on a per query basis. This is exemplified in FIG. 2.

Figure 2:
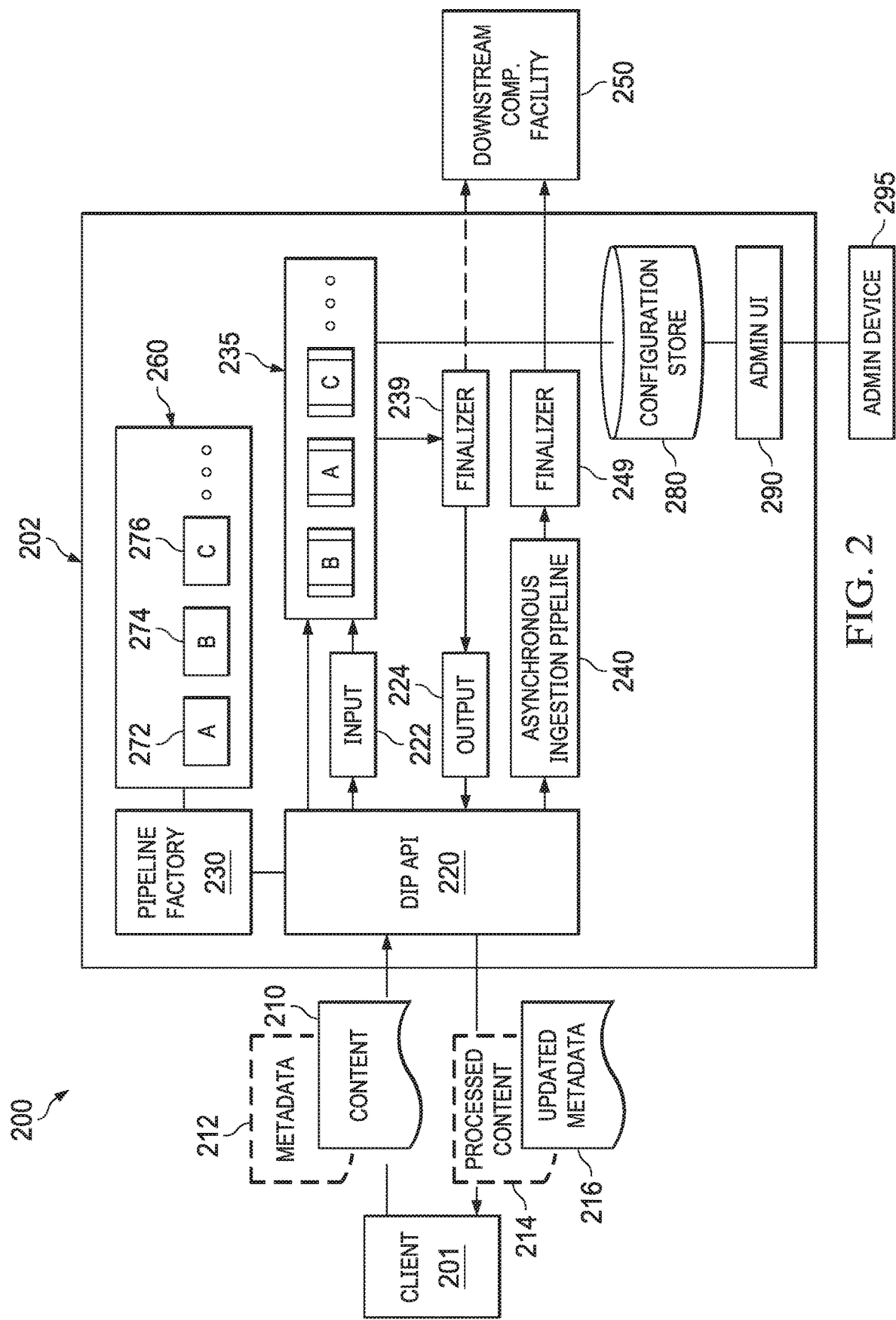
FIG. 2 depicts a diagrammatic representation of an example of a synchronous ingestion pipeline architecture according to some embodiments disclosed herein.

In the example of FIG. 2, client 201 may represent a client device running an external system or application communicatively connected to server system 202 running on one or more server machines of platform 200. As a non-limiting example, platform 200 includes the necessary computing hardware and software to operate an information processing or access system such as OpenText InfoFusion™. Platform 200 may provide a default client application and/or tools for developing custom client applications. A client application of platform 200 running on a client device may allow the client device to send documents (e.g., from a content management system or CMS) to platform 200 for processing (e.g., document conversion, language detection, content analytics, data extraction, etc.), indexing, storage, or a combination thereof.

In some embodiments, a uniform data ingestion pipeline (DIP) RESTful API (e.g., DIP API 220) running on server system 202 is configured for receiving ingestion requests from a plurality of clients, including client 201. Client systems and devices wishing to utilize the processing powers of a synchronous ingestion pipeline provided by platform 200 can make API calls to the same DIP API 220. There is no need to create individual connections between each client device and server system 202.

An ingestion request from client 201 can be accompanied with content 210 (which can include one or more files) and, optionally, metadata 212 (which can also be in the form of a file). Client 201 may send one binary (non-text) file at a time or multiple binary files in sequence. Each file may have its own metadata file. A file may also be sent without a metadata file. In some embodiments, an ingestion request from client 201 may include an optional parameter ("metadata") which indicates whether (true) or not (false) the submitted content includes associated metadata. In some embodiments, this optional parameter defaults to being true if not specified explicitly and is accepted by both synchronous and asynchronous ingestion requests. If metadata is not included with the submitted content, it is generated automatically from supplied or pre-configured properties.

In the example of FIG. 2, if metadata 212 is not included, a metadata file is automatically generated by server system 202 based on default properties configured on server system 202. This makes it easy if client 201 is only interested in metadata contained in content 210 and does not need or want external metadata added to content 210.

A client-provided metadata file may contain metadata conforming to a master metadata schema that defines what metadata may be required and/or optional (e.g., file type, creation date, author, etc.). As an example, the master metadata schema may describe XML schema definitions, including valid metadata fields supported by platform 200, so each client application has knowledge of what values can be placed in what metadata fields. For example, a document may reside in a CMS operating in an enterprise computing environment. A client application running on a client device in the enterprise computing environment may obtain the master metadata schema from platform 200 (e.g., using a GET command) and utilize the master metadata schema to define what metadata should be placed in a metadata file when the document is created through the CMS.

Input parameters in an ingestion request to platform 200 are standardized. When the client application sends the document to platform 200 for processing, if the metadata file is not present or does not meet the standard input requirements of platform 200, a metadata file is automatically generated based on default properties. More specifically, when an ingestion request is received, a processor responsible for parsing the ingestion request may operate to examine the ingestion request to determine whether a metadata file exists and, if so, determine whether a minimum of properties can be found in the metadata file. If so, the metadata file is used. If not, it automatically generates a metadata file using a set of default properties.

An auto-generated metadata file has a minimum of properties sufficient to allow the content to be processed. As an example, the default properties that may be included in an auto-generated metadata file can include an object identifier, a repository identifier, and a document type. The auto-generated metadata file does not include non-processing-essential metadata such as creation date, modification date, etc. In processing the content, the ingestion pipeline components may update the metadata file by augmenting the metadata. For example, a language processor may determine and add the language of the content as a piece of metadata to the metadata file.

The name(s) of ingestion pipeline component(s) to be called, and in what order they should be called, are specified in the ingestion request using a special query parameter "components" (also referred to herein as a "component parameter") supported by platform 200. For example, client 201 may request (e.g., on a per query basis) content 210 be processed using ingestion pipeline components 272, 274, 276 (which correspond to functions A, B, C in FIG. 2) in the order of function B, then function A, and then function C (which represents a dynamically custom-defined sequence specific to the ingestion request), by specifying "components: B, A, C" in the ingestion request.

In some embodiments, the dynamically custom-defined sequence can be validated by an API (e.g., DIP API 220) running on the information processing platform (e.g., platform 200) to ensure that the sequence specified by the client (e.g., client 201) is correct or doable. More specifically, when the API receives an ingestion request that contains a component parameter specifying a list of ingestion pipeline component names, the API may operate to take the list of ingestion pipeline component names, calls a pipeline factory (e.g., pipeline factory 230) with the list of ingestion pipeline component names, and requests the pipeline factory to create an ingestion pipeline instance for processing the input content (e.g., content 210) using the ingestion pipeline components corresponding to the list of ingestion pipeline component names in a dynamically custom-defined sequence as specified in the ingestion request.

In response, the pipeline factory may operate to determine whether any ingestion pipeline component name in the list of ingestion pipeline component names is incorrect. The pipeline factory may further operate to determine whether any ingestion pipeline component thus named cannot be found. For example, server system 202 may be configured with a set of ingestion pipeline components (e.g., 272, 274, 276, etc.). In this configuration, the set of ingestion pipeline components all live in memory 260 of server system 202. The pipeline factory's job is to rally the names from what's configured in the configuration. Thus, the pipeline factory has knowledge of the set of ingestion pipeline components in the configuration. The pipeline factory takes an ingestion pipeline component name from the API and, if an ingestion pipeline component of that ingestion pipeline component name is active, the ingestion pipeline component name is considered valid. In some embodiments, the pipeline factory may attempt to map the list of ingestion pipeline component names to an instance of ingestion pipeline that already has the named ingestion pipeline components "activated."

If the ingestion pipeline component names are valid, the pipeline factory creates an instance of an ingestion pipeline object. Once an ingestion pipeline object is created, the pipeline factory adds references (also referred to as "handles") to the actual (requested) ingestion pipeline components. As discussed above, these ingestion pipeline components have already been created and live in a computer memory where they are configured. This ingestion pipeline instance is specific to the ingestion request containing the list of ingestion pipeline component names. Such an ingestion pipeline object is not used in an asynchronous pipeline because it always looks to the input folder for data to be processed. Each ingestion pipeline object is dedicated to an individual client ingestion request. When an ingestion pipeline object is returned to the API, it has a hook to the particular client from where the ingestion request is received.

If an ingestion pipeline component name is incorrect or if an ingestion pipeline component cannot be found, the pipeline factory notifies the API that the list of ingestion pipeline component names is invalid. The API sends the list of ingestion pipeline component names back to the client and notifies the client that the list of ingestion pipeline component names is invalid.

The above described validation process takes place every time an ingestion request is received by the API. Accordingly, a new ingestion pipeline instance is created for each ingestion request, if the request is validated. Each of the ingestion pipeline objects thus created refers to one or more ingestion pipeline components that live in the memory. These ingestion pipeline components have no state and only act on what is given to them. They perform their respectively designated functions on the data that is passed to them and return their respective results. They do not store information globally that another ingestion request or ingestion pipeline component could access. These ingestion pipeline components operate completely independently from one another. This is why different ingestion pipeline instances can access the ingestion pipeline components in different orders and in different subsets of the ingestion pipeline components.

The ingestion pipeline object created by the pipeline factory is returned to the API. The API picks up the content from a "hot" folder (e.g., a storage location where incoming data is received), calls a file and its metadata, saves them in a temporary input folder (e.g., input 222), and instructs the ingestion pipeline object to process the contents of the input folder. This starts an ingestion pipeline process flow (e.g., pipeline 235) that is specific to the ingestion request. As the pipeline is processing the contents of the input folder, the pipeline is also given by the API a sync or streaming output object (e.g., output 224). As the pipeline is processing the contents of the input folder, the pipeline takes each result and writes to the streaming output object. The streaming output object is attached to a response that is eventually returned back to the client. That is, the API saves the content to be processed in a temporary folder and starts an instance of an ingestion pipeline. The ingestion pipeline processes the contents in the temporary folder and writes the results to a streaming output object.

The logic that makes it possible to return processing results (e.g., processed content and/or metadata) back to the client may partially reside in the API because it is the API that actually returns the processing results to the client. The ingestion pipeline has no knowledge of any client. Once the API has an ingestion pipeline object created for an ingestion request, it creates a streaming output object so the pipeline writes processed content and/or metadata to the streaming output object. When the pipeline processing is done, the API returns the streaming output object to the client.

In this way, unlike an asynchronous ingestion pipeline, a synchronous ingestion pipeline can return processed data (e.g., processed content 214) and/or an updated metadata file (e.g., updated metadata 216) to the client, instead of, or in addition to, providing processed data to a computing facility (e.g., downstream computing facility 250) such as an indexing engine or a relational database downstream from the ingestion pipeline. This updated metadata file (e.g., an XML file) can be an updated version of a metadata file provided to the synchronous ingestion pipeline by the client along with content submission and may include text extracted by the pipeline. An input metadata file may be stored in input 222 and an updated metadata file may be stored in output 224.

In an asynchronous ingestion pipeline, a client does not specify a list of ingestion pipeline components. The asynchronous ingestion pipeline is operable to process content asynchronously and does not return anything back to the client. Therefore, it does not set up handshaking so that the processed content can be returned back to the client. In an asynchronous ingestion pipeline, once the API has an ingestion pipeline object, it does not create a streaming output object and it does not return any processed content back to the client. Rather, once the API has written the incoming content to the temporary input folder and started the asynchronous ingestion pipeline, it notifies the client (e.g., by returning a status code support by the HyperText Transport Protocol (HTTP)) acknowledging that the ingestion request has been accepted successfully.

In some embodiments, when the pipeline processing is done, a finalizer (e.g., finalizer 239) takes the ultimate resulting metadata and text and writes to the streaming output object (output 224). In some embodiments, the finalizer is operable to clean up (e.g., delete) the temporary input folder and wrap up the output (e.g., format contents in output 224) if no downstream processing is necessary. That is, outcome from pipeline 235 is not provided to downstream computing facility 250. Rather, processed content 214 and/or updated metadata 216 (which has been updated from metadata 212 provided by client 201) is returned to client 201, for instance, by streaming through the API.

Streaming out through a REST API (in which data is returned bit by bit) entails using an output stream. To enable streaming, the finalizer may operate to capture outputs (e.g., metadata) from ingestion pipeline components, perform any necessary data conversions, generate entry types specific to the synchronous format, and redirect the processed data and/or metadata to the streaming output object (which is attached or otherwise hooked to the API's response to the client) so synchronous results can be sent back to the client. The pipeline itself does not know what the finalizer is doing. At the end of processing, the pipeline calls finalizer and the finalizer's job is to process (and format if necessary) and write to the streaming output.

An asynchronous ingestion pipeline (e.g., asynchronous ingestion pipeline 240) may also call a finalizer (e.g., finalizer 249). In embodiments where both an asynchronous ingestion pipeline and a synchronous ingestion pipeline are implemented, the API may operate to specify which finalizer to use (through a hook in an ingestion pipeline instance). For example, for an instance of a synchronous ingestion pipeline (the "pipeline"), the API may specify a finalizer that has been initialized with a reference or hook to a particular streaming output. The pipeline calls the finalizer at the very last step of its processing. The finalizer points to a streaming output and relates the content to the streaming output through the hook.

In some embodiments, the input and output of a synchronous ingestion pipeline can both be metadata. Such a synchronous ingestion pipeline may include a field mapper for mapping fields in the metadata.

In the example of FIG. 2, pipeline 235 represents a process flow involving calling a set of ingestion pipeline components 272, 274, 276 in a particular sequence (e.g., "B"→"A"→"C"). As a non-limiting example, ingestion pipeline component 274 (function B) can be a document converter configured for examining content 210, determining a file or document type of content 210, and extracting text, if available, from content 210 accordingly. Sometimes the document converter can produce extra metadata. As another example, ingestion pipeline component 272 (function A) can be a language detector or summarizer that summarizes texts into small chunks suitable, for example, for a search engine to consume. As yet another example, ingestion pipeline component 276 (function C) can be a content analytics component configured for extracting entities, person names, concepts, organization names, and so on, and for applying rules to generate more metadata based on, for instance, tags present in HTML content. Numerous functions can be readily included by adding ingestion pipeline components supported by platform 200.

Each such ingestion pipeline component is operable to perform some work on content 210 based on activation rule(s) and generate an outcome for the next ingestion pipeline component or component. An activation rule dictates whether an ingestion pipeline component is to perform at all. If an activation rule for an ingestion pipeline component does not pass, noting is modified by the ingestion pipeline component and content 210 is passed to the next ingestion pipeline component. This means that, in some embodiments, application of ingestion pipeline components may be rule-based, rather than query-based. For example, when rule-based decision making is activated, a synchronous ingestion pipeline may operate to apply a certain ingestion pipeline component if a particular ingestion pipeline rule applies; otherwise, the ingestion pipeline component is skipped. In some embodiments, activation of such rules may be triggered by the metadata contained in an input metadata file that specifies fields for which ingestion pipeline components would need to be called upon to provide answers based on the data being processed (e.g., call a language detector to determine what language the incoming content is in and update the language field in the metadata file with the appropriate answer) so that the metadata file accurately and adequately describes the content. In the example of FIG. 2, such rules may be stored in configuration store 280 which, in one embodiment, can be a rules database. Other suitable data structures may be used.

In some embodiments, control or "zookeeper" rules (e.g., activation rules for determining whether to activate an ingestion pipeline component, rules for controlling process flows, etc.) can be configured by an administrator using an administrative user interface ("admin UI") communicatively connected to the configuration store and running on the administrator's device. Further, the name of an ingestion pipeline component can be changed from its default value using the admin UI (e.g., by navigation to a menu or tab for that ingestion pipeline component and entering a new name). In the example of FIG. 2, an administrator may perform administrative actions relating to components of server system 202, including DIP API 220, through admin UI 290 running on admin device 295.

In the example illustrated in FIG. 2, the uniform DIP API is hosted at a network address (e.g., a universal resource locator or URL) on server system 202. The uniform DIP API's network address is configurable through admin UI 290 by modifying the uniform DIP API's configuration file stored in configuration store 280. As a non-limiting example, the following configurable properties can be configured through admin UI 290 to control a synchronous ingestion process:

maxFileCount—Maximum count of files that can be submitted by an individual synchronous ingestion request.
    maxFileSize—Maximum size (in bytes) of a file that can be submitted by a synchronous ingestion request.
    maxInputSize—Maximum total size (in bytes) of the input that can be submitted by an individual synchronous request.
    minPollingTimeout—Minimum polling timeout (in milliseconds).
    maxPollingTimeout—Maximum polling timeout (in milliseconds).
    maxConcurrentExtractionCount—Maximum count of concurrent document extractions.
    maxConcurrentIngestionCount—Maximum count of concurrent document ingestions.

As discussed above, in a synchronous ingestion pipeline, proposed data, metadata, or a combination thereof can be returned to a requesting client. The synchronous ingestion pipeline can be run on demand and any input metadata can be placed in a designated input folder that is separate from any asynchronous ingestion pipeline. At the end of the process flow of a synchronous ingestion pipeline, the metadata is not disposed of and can be returned to the requesting client. The processed data can also be returned to the requesting client (and perhaps persisted at the client, instead of being indexed).

Also, as discussed above, the uniform DIP API can be used by a plurality of clients to call any number and/or combination of ingestion pipeline components for synchronous ingestion. That is, embodiments provide a new way for clients of the uniform DIP API to submit documents for synchronous processing by an ingestion pipeline that enables them to:

Specify both the set and sequence of ingestion pipeline components to be applied to each submitted document (including metadata and associated text/binary content).
    Synchronously receive the processing result or outcome for each submitted document (e.g., updated metadata and extracted text) as it becomes available.

As discussed above, synchronous ingestion is independent of asynchronous ingestion. However, both synchronous ingestion and asynchronous ingestion can be accessible by way of the same uniform DIP API. Further, both synchronous ingestion and asynchronous ingestion can be used simultaneously by different clients without one interfering with the other. Accordingly, an information processing system can implement synchronous ingestion alone or in conjunction with asynchronous ingestion. An example implementation will now be described.

Example Implementation

In some embodiments, synchronous ingestion can be invoked by sending a POST method request to either the/ingestion/files or/ingestion/zip resource of the uniform DIP API, with some additional query parameters (described below) supported by the uniform DIP API. The POST method is a request method support by the HTTP. The content to be processed using synchronous ingestion can be specified in the body of the POST method request. The configurable properties for controlling a synchronous ingestion process can be set separately for the/ingestion/files and/ingestion/zip resources of the uniform DIP API.

As a non-limiting example, the content to be processed may be specified in the body of a POST method request as a ZIP file. This POST method is, therefore, responsible for receiving the specified ZIP file and ingesting its contents. As discussed above, once received by the uniform DIP API, the content of the ZIP file is first validated, the content is extracted from the ZIP file, the content file paths are rewritten, and an instance of a synchronous ingestion pipeline is instantiated to ingest the inflated content. The POST method may include a query parameter "sync" which, if set to "true" (i.e., sync=true), a synchronous ingestion pipeline process will perform all of its extraction and validation and return once the ingestion is launched. If set to "false," the method will transfer the file to a temporary location and return a job identifier to the client in an open standard file format such as JavaScript Object Notation (JSON).

As another non-limiting example, the content to be processed for synchronous ingestion may be specified in the body of a POST method request as a list of metadata and content files. Once received by the uniform DIP API, each file is validated and dropped into a "hot" folder. After the last file has been validated and added to the hot folder, ingestion is launches by creating a marker file such as a "read.txt" file. The POST method returns as soon as the marker file has been successfully created. That is, this example POST method does not wait for the synchronous ingestion to complete. This means that only validation errors and errors resulting from the inability to access or write to the hot folder are reported back to the client and ingestion-related errors are not reported by this example POST method.

In some embodiments, a synchronous ingestion request differs from an asynchronous ingestion request in that it explicitly specifies both the set and sequence of ingestion pipeline components to be applied to the submitted documents by way of a new "components" query parameter. In some embodiments, the value of the "components" query parameter can be a comma separated values (CSV) list of ingestion pipeline component names. As a non-limiting example, by default, the following ingestion pipeline components can be configured for use with synchronous ingestion:

DocumentOperationValidator
    DocumentConvertor
    FieldMapper
    FileTypeNormalizer
    Detagger
    LanguageDetector
    Summarizer
    Analyzer SolrIndexer
DBAdapter If need be, the set of ingestion pipeline components configured for synchronous ingestion can be different from or the same as those configured for asynchronous ingestion. As an example, configuration can be done by modifying the value of a particular property (e.g., "knownComponents") of a bean (e.g., "componentApplierFactory") defined in a configuration file (e.g., "pipeline.xml"). For example, the configuration file may define the following beans:

pipelineFactory: A pipeline factory used to instantiate an ingestion pipeline object that will process documents in a dedicated temporary input folder using a pipeline component applier tailored for a given set and sequence of ingestion pipeline components.

componentApplierFactory: A pipeline component applier factory used to instantiate a component applier object tailored for a given set and sequence of ingestion pipeline components.

Additionally, the following properties may be added to the bean definition for certain API components, for instance, a multi-part file handler and a zip file handler.

pipelineFactory: This property references the pipelineFactory bean defined in the configuration file. This bean is used to instantiate an ingestion pipeline for an individual synchronous ingestion request.

componentApplierFactory: This property references the componentApplierFactory bean defined in the configuration file. This bean is used to apply the set and sequence of ingestion pipeline components specified by the components query parameter to the documents submitted by an individual synchronous ingestion request.

documentFinalizer: This property references a document cleaner bean defined in the configuration file. This bean, also used by asynchronous ingestion, is responsible for removing document metadata and content files from the system after they are processed.

The "components" query parameter is a query parameter specific to synchronous ingestion. This query parameter is used to specify, in any sequence, a set of ingestion pipeline component names of configured ingestion pipeline components. In some embodiments, the client-specified sequence (or custom order) of ingestion pipeline component names may be validated to ensure that it indeed makes sense. For example, a text extractor should be called in a process flow before a text analyzer so that text extracted from the content can be provided as input to the text analyzer.

In addition to the "components" query parameter, a synchronous ingestion request may specify an optional polling timeout "pollingTimeout" query parameter to control how long the uniform DIP API should wait when polling for new processing results from the ingestion pipeline.

The value of the "pollingTimeout" query parameter, if specified, can be a number of milliseconds between the currently configured minimum and maximum polling timeout values. The minimum and maximum polling timeout values (in one embodiment, initially 60000 and 600000, respectively) can be configured via the REST API tab of the admin UI. In one embodiment, if the "pollingTimeout" query parameter is not specified, its value can default to the configured minimum polling timeout value.

In asynchronous ingestion, if the request specifies an invalid value for a query parameter (such as an unknown ingestion pipeline component name or a polling timeout out of range), or contains ill-formatted input, the response will be a "400 Bad Request" response supported by the HTTP. That is, an asynchronous ingestion response only confirms whether or not the content submission/extraction was successful.

In contrast, a synchronous ingestion response (e.g., "200 OK") can also include, using the same format for the body as used in the request, the processing result for each submitted document (e.g., updated metadata and extracted text). If processing fails for a given document, the processing result for that document may include a file entry containing a brief error message, the name of the ingestion pipeline component where the error occurred, as well as the updated metadata, and any extracted text at the point just before the error occurred.

The synchronous ingestion described above advantageously provides a uniformed interface to individual data processing solutions. Typically, a data processing system may interface with these individual solutions independently, using different APIs. For example, a data processing system may have a text mining engine (TME), a document converter, and a data analyzer. These individual solutions can operate independently from one another, have different APIs, and support different input formats. The data processing system would therefore interface with the TME using a TME API, interface with the document converter using a document converter API, and interface with the data analyzer using a data analyzer API. This complexity is eliminated in the synchronous ingestion solution disclosed herein. Instead, any client can use the same uniform DIP API to call the synchronous ingestion pipeline with content (e.g., a PDF document, a Word document, etc.) and, optionally, a metadata file. This metadata file follows the ingestion pipeline's format which can be the same format that is used by a data collector described below.

In some embodiments, there is only one input format—the input content (e.g., a binary file and, if desired, a metadata file) and a list of ingestion pipeline component names referencing a certain order or sequence of configured ingestion pipeline components. A requesting user on a client device does not need to know any specifics (e.g., input format, method, API resource, etc.) about the individual ingestion components.

Furthermore, custom components can be added. For example, suppose a new optical character recognition (OCR) service can extract text from images and videos. A custom OCR processor can be written for the ingestion pipeline and configured to communicate with this new OCR service such that, through the synchronous ingestion, any client could submit content and include the OCR processor in the list of ingestion pipeline components to be called, for instance, before calling a data analyzer. By doing so, this custom component adds new functionality to the underlying data processing system which now can process and analyze text extracted from images and videos, in addition to the PDF and Word documents. The ability to customize ingestion pipeline components can be as flexible as the ingestion pipeline itself.

Again, asynchronous ingestion and synchronous ingestion differs at least in that 1) a client can specify which ingestion pipeline component to run and in what order (and that can be a subset of a whole collection—it is not required to call a particular component or all components); and 2) the requesting client can get a response back—the metadata status is updated along the way and the client can get the updated metadata back. This process is further illustrated in FIG. 3.

Figure 3:
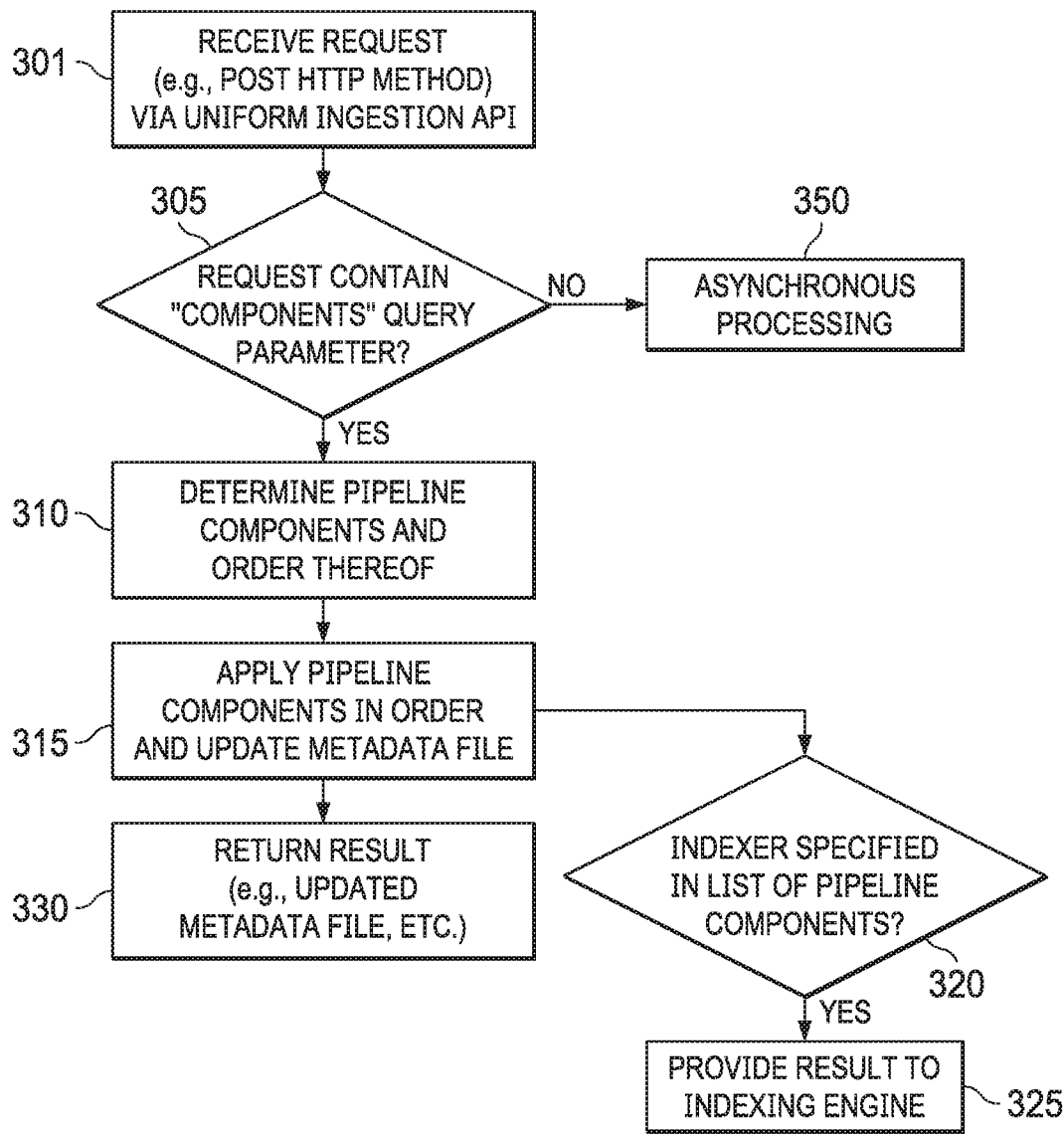
FIG. 3 is a flow chart illustrating an example of a synchronous ingestion process according to some embodiments disclosed herein.

In the example of FIG. 3, an ingestion request may be received via a uniform DIP API (301). The uniform DIP API and their resources may support different input methods. For example, one resource may accept zip files and the other one may accept a stream-MIME type called multipart/mix. A zip file can be an archive of a metadata file and a binary file, while a multipart request can include one part that represents a metadata file and another part that represents a binary file. From the perspective of a client, it is possible that the only user-visible difference between an asynchronous ingestion request and a synchronous ingestion request is that the latter includes a particular query parameter (e.g., "components") which specifies the component(s) that apply. This masks the complexity from the clients as they do not need to drastically change or learn new input methods.

A determination is made as to whether an ingestion request contains the particular "components" query parameter (305). If the ingestion request does not contain the particular query parameter, the request is processed in an asynchronous ingestion process (350). As described above, in an asynchronous ingestion process, a document is processed in a fixed workflow (i.e., a fixed set of data processing elements will be applied to the document in a predetermined order) and the final result will be content in the search engine.

If the ingestion request contains the particular query parameter, the query parameter is extracted and used to determine what ingestion pipeline components to call and in what order in a synchronous ingestion process (310). The synchronous ingestion process calls the listed ingestion pipeline components in the specified order and, as each ingestion pipeline component operates, they update the metadata file stored in a file location used by the synchronous ingestion pipeline (315). As described above, the asynchronous ingestion pipeline utilizes a different file location to store temporary data, which is then discarded once the processing is complete.

While both the asynchronous ingestion pipeline and the synchronous ingestion pipeline can provide results to an indexing engine, a client of the synchronous ingestion pipeline can choose not to have any result sent to the indexing engine. This choice is not available or possible when the asynchronous ingestion pipeline is used. With the synchronous ingestion pipeline, if an indexer is specified in a query, indicating that a client wishes to index a document processed by the synchronous ingestion pipeline (320), the result is provided to an indexing engine (325). Either way, the client can get the result (e.g., enriched or updated metadata file) back (330). The updated metadata file may be augmented with additional metadata by the ingestion pipeline components called in the synchronous ingestion process.

The list of ingestion pipeline component names is provided on the fly (e.g., specified in a query request when a client makes a call) and not preconfigured. In addition to the ingestion pipeline components described above, other custom ingestion pipeline components may also be added and used.

As a non-limiting example, specify in an ingestion request: "Components: DocumentConvertor, LanguageDetector, Analyzer." DocumentConvertor, LanguageDetector, Analyzer will be applied in this precise order. That is, the order by which these ingestion pipeline components are executed depends on how the client call is made. In one embodiment, no validation is performed to evaluate whether such an order is logical. In some embodiments, a validation may be performed to validate the order.

For example, suppose an ingestion request specifies: "Components: Analyzer, TextExtractor, DocumentConvertor." In this case, Analyzer may need the text of a document in order to perform its analyzing functionality and TextExtractor is needed to extract the text from the document. If Analyzer is applied before TextExtractor, there will be no input text to Analyzer (since no text has yet to be extracted from the input document) and Analyzer gets an empty text input. If TextExtractor is applied after Analyzer and DocumentConvertor is applied after TextExtractor, a result may still be generated by DocumentConvertor, but the requesting client will not get any entity in return from Analyzer. Thus, this order should be invalidated. In one embodiment, a valid order may be suggested, for instance, "Components: TextExtractor, Analyzer, DocumentConvertor."

In some embodiments, the "result" or "results" can be returned in the form of an updated metadata file. As an ingestion pipeline component extracts information from the original text, it adds information to the metadata file. For example, LanguageDetector may add an element called "Language List" to the metadata file and Analyzer may add an element called "extension" to the metadata file.

In some embodiments, this metadata file follows a specific format and is provided to the ingestion pipeline with a binary file such as a Word document. In some embodiments, neither the original binary file nor the original metadata file is returned to a requesting client. Rather, the client may receive an updated metadata file which is augmented with information provided by the ingestion pipeline components called by the ingestion pipeline. In some cases, the client may get the extracted text back (e.g., in a text file).

As a non-limiting example, the ingestion pipeline may receive, via its DIP API, a zip file. The zip file may contain a binary file "one.doc" for processing by the ingestion pipeline. Alongside the "one.doc" file is an .xml file "one.xml" containing metadata conforming to a master metadata schema that defines a set of attributes that describe the binary file. Suppose a client requests the ingestion pipeline applying DocumentConvertor and LanguageDetector to the "one.doc" file. The ingestion pipeline returns a zip file to the client containing the processing result. Specifically, the returned zip file has an updated "one.xml" containing the processing result (e.g., new and/or updated metadata). In this example, the updated one.xml is modified from the previous one.xml with the language list added by LanguageDetector.

Suppose a text extractor is also applied to the "one.doc" file by the ingestion pipeline. Alongside the "one.xml" file, the returned zip file may also contain an "one.txt" text file which contains the extracted text. This text file has no formatting information for the extracted text.

Suppose the client does not wish to index the "one.doc" file (e.g., because "indexer" was not included in the client request). None of the input and processing result is indexed and/or stored at the backend. What was saved temporarily in the processing is discarded. In this use case, the ingestion pipeline is used as a cohesive standardized frontend system for processing documents and generating and returning results back to the client(s). In this sense, the ingestion pipeline can function as a true service as it does not have any side effects. No storage update. No index update. Unless a client specifically specifies an indexer, the ingestion pipeline can service any combination of desired document processing needs without involving a backend server system. This is further illustrated in FIG. 4.

Figure 4:
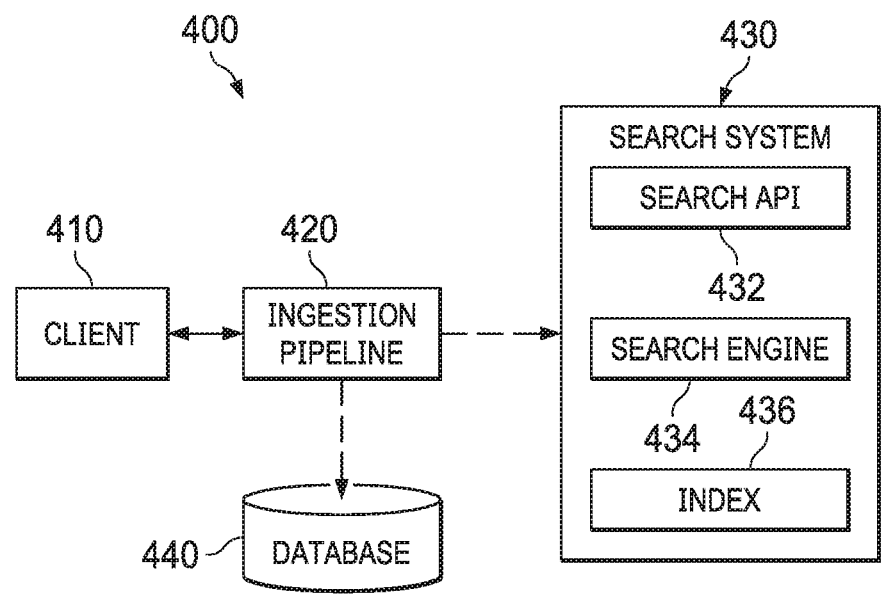
FIG. 4 depicts a diagrammatic representation of an example of a data processing system in which embodiments of a synchronous ingestion pipeline disclosed herein may be implemented.

In the example of FIG. 4, ingestion pipeline 420 may implement an embodiment of a synchronous ingestion pipeline described above. Ingestion pipeline 420 may be part of a larger system (e.g., data processing system or information management system 400) that includes search system 430 and/or database system 440. Ingestion pipeline 420 may function as a standardize interface for multiple server modules (e.g., DocumentOperationValidator, DocumentConvertor, FieldMapper, FileTypeNormalizer, Detagger, LanguageDetector, Summarizer, Analyzer, SolrIndexer, DBAdapter, etc.) that provide various services so that client(s) 410 at the client side do not have to call these individual processors operating at the server side.

There can be many synchronous ingestion pipeline instances running at any given time. In some embodiments, any number or combination of ingestion pipeline components can be called by any number of clients. For example, a conversion service can be called to remove tags from an HTML file; a language detector can be called to determine the language from the text provided by the conversion service. An OCR processor can be called to get metadata from an image file. The metadata can be used by an indexing engine to index the image, stored in a relational database, and/or returned to the client.

In some embodiments, ingestion pipeline 420 may also implement an asynchronous ingestion pipeline described above. As described above with reference to FIG. 3, if a client request does not contain a certain query parameter (e.g., "components"), the client request may be handled by the asynchronous ingestion pipeline. In some embodiments, at any given time, ingestion pipeline 420 may process client requests utilizing both the asynchronous ingestion pipeline and the synchronous ingestion pipeline.

If client 410 sends ingestion pipeline 420 a request to enrich a document, but does not specify any indexer, ingestion pipeline 420 may process the document in a synchronous ingestion process and return the processing result to client 410, as described above. If client 410 sends ingestion pipeline 420 a request to enrich a document and specifies an indexer (e.g., search engine 434), ingestion pipeline 420 may process the document in a synchronous ingestion process, return the processing result to client 410, and provide the processing result to a downstream system such as search system 430 or database system 440. As a non-limiting example, search engine 434 may operate to index the processing result provided by ingestion pipeline 420 and update index 436 accordingly such that the indexed information (e.g., full text and metadata associated with the document) is searchable via search API 432 of search system 430. In some embodiments, the indexed information may be stored in database system 440. If client 410 sends ingestion pipeline 420 a request to index the document and does not specify a synchronous pipeline triggering query parameter (e.g., the "components" query parameter described above) in the request, ingestion pipeline 420 may process the document in an asynchronous ingestion process and provide the processing result to search system 430, as described above.

Such processing flexibility—the asynchronous and synchronous processes can be used independently or in conjunction—provided by ingestion pipeline 420 is not available or possible in data processing systems that employ only asynchronous ingestion pipelines. The ability of ingestion pipeline 420 to ingest and process data in a synchronous manner (in addition to asynchronously) advantageously allows for a more flexible workflow, allowing clients to customize data processing based on their individual needs and get results back. Furthermore, as described above, ingestion pipeline 420 can be implemented as a standalone system or as part of a larger data processing system such as an information processing or management system. Examples of an information management system can be found in U.S. Patent Application Publication No. US 2015/0058314 A1, which is incorporated by reference herein.

Figure 5:
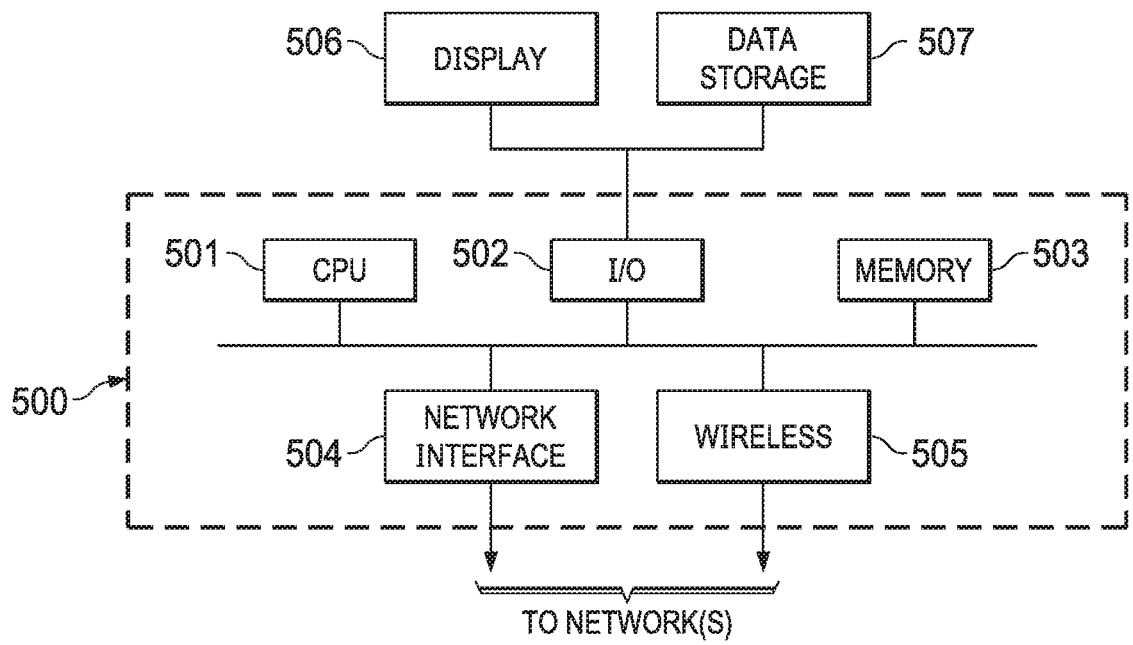
FIG. 5 depicts a diagrammatic representation of an example of a data processing system embodying an example of an ingestion pipeline disclosed herein.

FIG. 5 depicts a diagrammatic representation of a data processing system for implementing a system for processing messages. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. The scope of the present disclosure should be determined by the following claims and their legal equivalents.

What is claimed is:

1. A method, comprising:
receiving, from a client device by a data ingestion pipeline application programming interface (DIP API) running on a server machine, an ingestion request for ingestion of data;
determining, by the DIP API, whether the ingestion request includes a query parameter;
responsive to the query parameter not being found in the ingestion request, directing the ingestion request to an asynchronous ingestion pipeline in which the data is processed through a predetermined workflow;
responsive to the query parameter being found in the ingestion request, extracting the query parameter and determining, by the DIP API using the query parameter, what ingestion pipeline components to call and in what order in a synchronous ingestion pipeline in which the data is processed through a dynamic workflow; and
starting, by the DIP API, the synchronous ingestion pipeline consisting of the ingestion pipeline components determined by the DIP API using the query parameter from the ingestion request, wherein the data is ingested through the synchronous ingestion pipeline in which the ingestion pipeline components apply different functions to the data in the order determined by the DIP API based on the ingestion request.

2. The method according to claim 1, wherein the synchronous ingestion pipeline is one of a plurality of synchronous ingestion pipeline instances, the plurality of synchronous ingestion pipeline instances corresponding to multiple ingestion requests by multiple client devices communicatively connected to the DIP API.

3. The method according to claim 1, wherein the data accompanying the ingestion request comprises one or more files and wherein each of the one or more files is associated with a metadata file.

4. The method according to claim 3, further comprising:
updating the metadata file to include metadata provided by the ingestion pipeline components of the synchronous ingestion pipeline.

5. The method according to claim 4, further comprising:
providing the metadata to an indexing engine, wherein the indexing engine uses the metadata to index the data;
storing the metadata in a relational database; or
returning the metadata file thus updated to the client device.

6. The method according to claim 1, further comprising:
returning a text file to the client device, wherein the text file contains text extracted from the data as the data is processed through the synchronous ingestion pipeline.

7. The method according to claim 1, wherein the ingestion pipeline components comprise at least one of a text extractor, an image analyzer, a text analyzer, a document converter, a conversion service, a language detector, or an optical character recognition processor.

8. A system, comprising:
a processor;
a non-transitory computer-readable medium; and
stored instructions translatable by the processor for:
receiving, from a client device, an ingestion request for ingestion of data;
determining whether the ingestion request includes a query parameter;
responsive to the query parameter not being found in the ingestion request, directing the ingestion request to an asynchronous ingestion pipeline in which the data is processed through a predetermined workflow;
responsive to the query parameter being found in the ingestion request, extracting the query parameter and determining, using the query parameter, what ingestion pipeline components to call and in what order in a synchronous ingestion pipeline in which the data is processed through a dynamic workflow; and
starting the synchronous ingestion pipeline consisting of the ingestion pipeline components determined using the query parameter from the ingestion request, wherein the data is ingested through the synchronous ingestion pipeline in which the ingestion pipeline components apply different functions to the data in the order determined based on the ingestion request.

9. The system of claim 8, wherein the synchronous ingestion pipeline is one of a plurality of synchronous ingestion pipeline instances, the plurality of synchronous ingestion pipeline instances corresponding to multiple ingestion requests by multiple client devices communicatively connected to the system.

10. The system of claim 8, wherein the data accompanying the ingestion request comprises one or more files and wherein each of the one or more files is associated with a metadata file.

11. The system of claim 10, wherein the stored instructions are further translatable by the processor for:
updating the metadata file to include metadata provided by the ingestion pipeline components of the synchronous ingestion pipeline.

12. The system of claim 11, wherein the stored instructions are further translatable by the processor for:
providing the metadata to an indexing engine, wherein the indexing engine uses the metadata to index the data;
storing the metadata in a relational database; or
returning the metadata file thus updated to the client device.

13. The system of claim 8, wherein the stored instructions are further translatable by the processor for:
returning a text file to the client device, wherein the text file contains text extracted from the data as the data is processed through the synchronous ingestion pipeline.

14. The system of claim 8, wherein the ingestion pipeline components comprise at least one of a text extractor, an image analyzer, a text analyzer, a document converter, a conversion service, a language detector, or an optical character recognition processor.

15. A computer program product comprising a non-transitory computer-readable medium storing instructions translatable by a processor of a server system for:
receiving, from a client device, an ingestion request for ingestion of data;
determining whether the ingestion request includes a query parameter;

responsive to the query parameter not being found in the ingestion request, directing the ingestion request to an asynchronous ingestion pipeline in which the data is processed through a predetermined workflow;

responsive to the query parameter being found in the ingestion request, extracting the query parameter and determining, using the query parameter, what ingestion pipeline components to call and in what order in a synchronous ingestion pipeline in which the data is processed through a dynamic workflow; and starting the synchronous ingestion pipeline consisting of the ingestion pipeline components determined using the query parameter from the ingestion request, wherein the data is ingested through the synchronous ingestion pipeline in which the ingestion pipeline components apply different functions to the data in the order determined based on the ingestion request.

16. The computer program product of claim 15, wherein the synchronous ingestion pipeline is one of a plurality of synchronous ingestion pipeline instances, the plurality of synchronous ingestion pipeline instances corresponding to multiple ingestion requests by multiple client devices communicatively connected to the server system.

17. The computer program product of claim 15, wherein the data accompanying the ingestion request comprises one or more files and wherein each of the one or more files is associated with a metadata file.

18. The computer program product of claim 17, wherein the instructions are further translatable by the processor for:
updating the metadata file to include metadata provided by the ingestion pipeline components of the synchronous ingestion pipeline.

19. The computer program product of claim 18, wherein the instructions are further translatable by the processor for:
providing the metadata to an indexing engine, wherein the indexing engine uses the metadata to index the data;
storing the metadata in a relational database; or
returning the metadata file thus updated to the client device.

20. The computer program product of claim 15, wherein the instructions are further translatable by the processor for:
returning a text file to the client device, wherein the text file contains text extracted from the data as the data is processed through the synchronous ingestion pipeline.

\* \* \* \* \*